United States Patent [19]

Pruden

[11] 4,314,706
[45] Feb. 9, 1982

[54] CHUCKS OF CONSTANT JAW FORCE

[75] Inventor: Samuel H. Pruden, East Hartford, Conn.

[73] Assignee: Cushman Industries, Incorporated, Hartford, Conn.

[21] Appl. No.: 36,739

[22] Filed: May 7, 1979

[51] Int. Cl.³ .................. B23B 31/14; B23B 31/30
[52] U.S. Cl. .................. 279/1 C; 60/565; 279/4
[58] Field of Search .................. 279/1 C, 4; 60/565, 60/566

[56] References Cited

FOREIGN PATENT DOCUMENTS 2530573 1/1977 Fed. Rep. of Germany .......... 279/4
2542570 4/1977 Fed. Rep. of Germany ...... 279/1 C Primary Examiner—Z. R. Bilinsky

[57] ABSTRACT

Chuck installation with a cylinder and piston for fluid operation of the chuck jaws, providing a plunger projecting into the cylinder and movable in opposite directions for decreasing and increasing the volume of the cylinder and thereby increasing and decreasing the pressure of the operating fluid therein, and operating means, including weights, turning with the chuck and responsive to centrifugal force of these weights to force the plunger deeper into the cylinder for increasing the pressure of the operating fluid therein and thereby counteract operational centrifugal force of the jaws in operation of the chuck.

8 Claims, 7 Drawing Figures

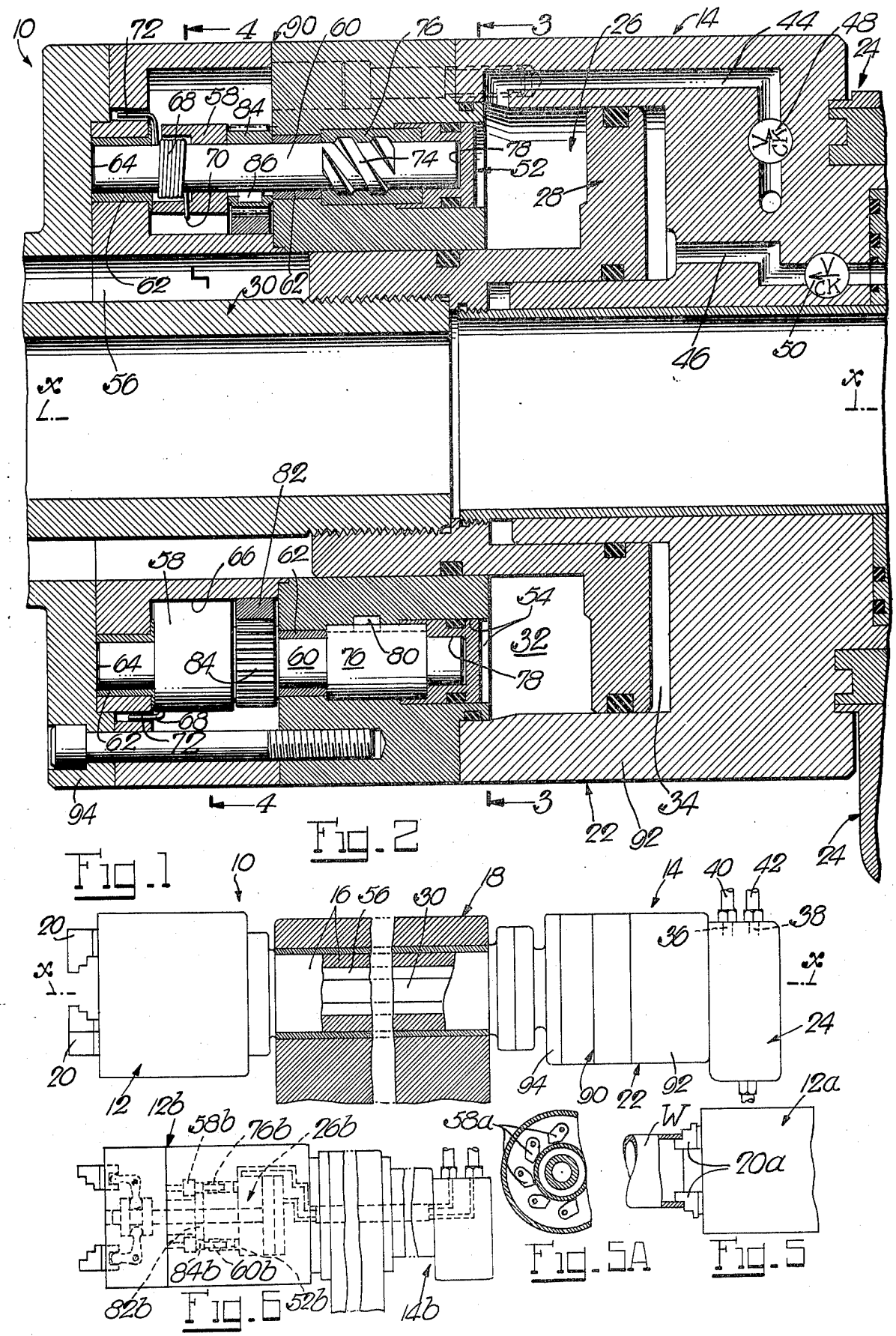

CHUCKS OF CONSTANT JAW FORCE

This invention relates to chucks in general, and to chucks of constant jaw force in particular.

Chucks of the type with which the invention is concerned are required to hold work with a fairly constant grip at any, including the highest, operational chuck speed and regardless of the ensuing centrifugal force acting on the chuck jaws. Prior chucks of this type, which are sometimes referred to as "centrifugally balanced chucks", rely on weights for counteracting centrifugal force of the jaws in operation of the chucks, with the weights being to this end operatively linked to the chuck jaws. However, while these prior chucks are satisfactory for many applications, they are unsatisfactory, if not unsuited, for other applications. Thus, there are many chuck applications that impose on the chucks weight and/or size limitations which, in turn, impose similar limitations on the counterweights so that these counteract only part, and sometimes no more than half, of the operational centrifugal force acting on the jaws, yet such chucks are accepted by the trade for lack of chucks which within the same weight or size limitations afford greater centrifugal balance between the counterweights and jaws. Also, since the counterweights in these chucks are, by their operating connections with the jaws, movable with, but directionwise counter to, the jaws, the counterweights will in most, if not all, work-gripping positions of the jaws be spaced radially from the rotary chuck axis differently than the jaws and, hence, be subjected to centrifugal force of a magnitude different from that of the centrifugal force acting on the jaws with ensuing centrifugal imbalance between the counterweights and jaws. In this connection, and owing to the movement of the counterweights and jaws characteristically counter to each other in closing the jaws on work, the jaws may in some, and particularly more extreme, work-gripping positions be radially spaced from the rotary chuck axis so much differently than the counterweights that the ensuing centrifugal imbalance between the latter and the jaws particularly at the higher chuck speeds will become grossly excessive and the work grip of the jaws may even be dangerously weakened without giving any indication of such hazardous chuck condition.

It is a primary object of the present invention to provide a chuck of this type in which centrifugal force on the jaws in operation of the chuck is counteracted by weights which, while yieldable under centrifugal force, are movable neither with nor counter to the jaws as in prior chucks of this type, thereby to avoid the aforementioned serious deficiencies of possible grossly excessive centrifugal imbalance between the weights and jaws and even hazardous performance of the jaws if the weights move with and counter to the jaws. To achieve this end, the chuck is characterized by fluid operation of the jaws at least into closure on, and firm grip with, work, and the counterweights are arranged to counteract the centrifugal force on the jaws by increasing the pressure of the jaw-operating fluid in response to centrifugal force of these weights in operation of the chuck.

It is a further object of the present invention to provide a chuck of this type in which the aforementioned fluid operation of the jaws is by way of a cylinder and a piston therein which is operatively connected with the jaws and divides the cylinder into chuck-closing and chuck-opening cylinder ends, and the counterweights and cylinder have an operating connection which includes a plunger that projects into the chuck-closing cylinder end and is moved in opposite directions to decrease or increase the volume of this cylinder end and accordingly increase or decrease the pressure of the operating fluid therein in response to increasing or decreasing centrifugal force to which the counterweights are subjected in operation of the chuck. With this arrangement, the pressure of the operating fluid in the chuck-closing cylinder end will not only increase with increasing centrifugal force of the counterweights, but will also decrease with decreasing centrifugal force of these weights and thus assure safe work-holding performance of the jaws even if there should be interposed in the fluid passage to the chuck-closing cylinder end a safety check valve that locks the operating fluid in this cylinder end in well-known manner in case of a sudden marked drop in pressure of the supply fluid as caused, for example, by a break in the fluid supply line during operation of the chuck. Further, if the cylinder for fluid operation of the jaws is provided in the rotary section of a well-known fluid coupling at the rear end of the power spindle of a lathe which carries the chuck at its front end, the counterweights and their operating connection with the cylinder, also referred to as "jaw balance system" for brevity, may be provided in or on this rotary coupling section and, hence, be totally separated from the chuck which, therefore, may have any weight or size limitations without imposing any similar limitations on this jaw balance system that could spell the sacrifice of vital "centrifugal balance" between the jaws and counterweights. Also, in so arranging the jaw balance system at such a fluid coupling, any chuck in an existing installation with such a coupling may be converted to a "centrifugally balanced" chuck by adding the jaw balance system to the coupling without necessitating any change whatever in the installed chuck.

Another object of the present invention is to provide a chuck of this type in which the counterweights and their operating connection with the cylinder, i.e. the jaw balance system, afford much freedom for the design of this system for best results. To this end, the plunger element of this system is preferably a full ring which is axially slidable in a recess in one of the opposite endwalls of the cylinder to thereby increase or decrease the volume of the latter, and the system also includes a number of rock shafts carrying the counterweights and a like number of drive elements for the ring plunger, of which the rock shafts are equally spaced radially from, and angularly about, the axis of this ring plunger and they extend parallel to this axis in bearings in which they are mounted for rocking motion but against axial motion, and the drive elements are sleeves which are axially movable on the rock shafts but are held against rotation, with the ring plunger being backed against the sleeves, and the rock shafts and sleeves having cam and follower connections which on rotary response of the rock shafts to centrifugal displacement of the counterweights cooperate to displace the sleeves axially and thereby force the ring plunger deeper into the cylinder to increase the pressure of the operating fluid therein. This arrangement secures several advantages. Thus, the ring shape of the plunger of the jaw balance system not only permits the advantageous provision of a throughhole in a chuck installation, but also affords an adequate fluid displacement area of this plunger to effect an increase of the pressure of the operating fluid in the cylinder for counteracting most, if not all, of the operational centrifugal force of the jaws on such displacement of the counterweights as centrifugal force thereon will bring about. Further, with the rock shafts and associated drive sleeves being arranged around the ring plunger, a good number of these shafts and sleeves, and hence also of counterweights, may be distributed over this fairly large expanse of the available space, wherefore the counterweights may have a combined mass large enough to be instrumental in bringing about counteraction by these weights of most, if not all, of the operational centrifugal force on the jaws, yet the counterweights may individually be of sufficiently small size to be confined substantially within the diametric confines of the cylinder in the chuck or in the fluid coupling, whichever hold the jaw balance system. Also, the counterweights are in idle condition of the chuck preferably spring-urged into a home or rest position which is the same in all possible different work-gripping positions of the jaws, wherefore the magnitude of the centrifugal force on the counterweights, as well as their moments, vary identically over the same range of chuck speeds, and these factors are also instrumental in bringing about counteraction by these weights of most, if not all, of the operational centrifugal force on the jaws in operation of the chuck.

Further objects and advantages will appear to those skilled in the art from the following, considered in conjunction with the accompanying drawings.

In the accompanying drawings, in which certain modes of carrying out the present invention are shown for illustrative purposes:

FIG. 1 is a diagrammatic view of a chuck installation with a fluid coupling which embodies the invention;

FIG. 2 is an enlarged longitudinal section through a featured part of the fluid coupling in the chuck installation of FIG. 1;

Figure 3:
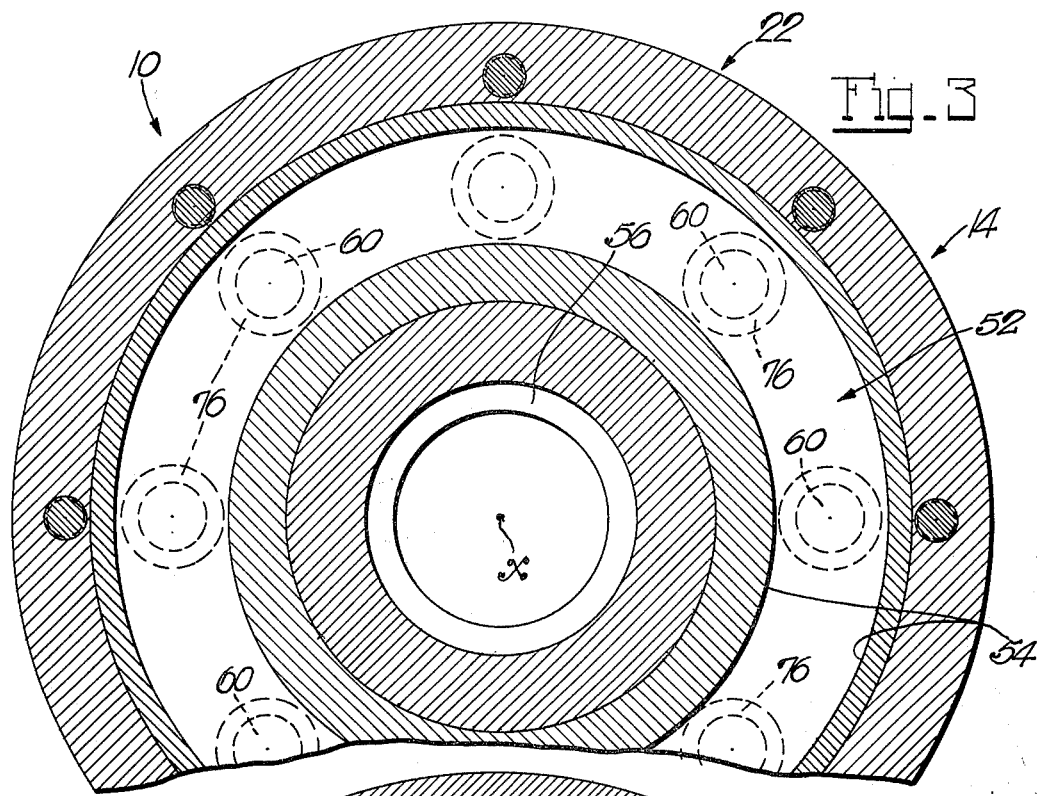
Figure 4:
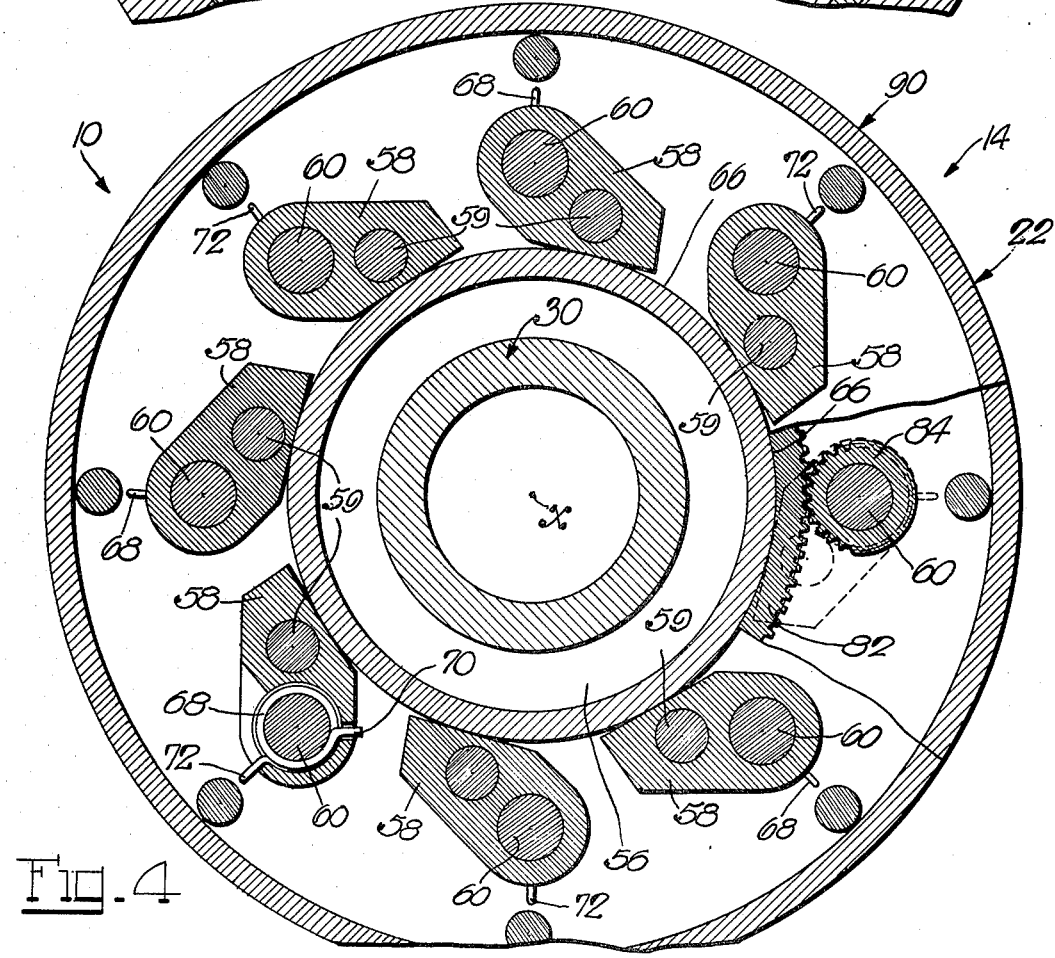

FIGS. 3 and 4 are cross-sections through the fluid coupling taken substantially on the lines 3—3 and 4—4, respectively, of FIG. 2;

FIG. 5 is a fragmentary diagrammatic view of a chuck installation embodying the invention in a modified manner;

FIG. 5A is a fragmentary cross-section through the chuck installation of FIG. 5; and FIG. 6 is a diagrammatic view of a chuck installation embodying the invention in a further modified manner.

Referring to the drawings, and more particularly to FIGS. 1 to 4 thereof, the reference numeral 10 designates a chuck installation which has an axis x and provides in this instance a chuck component 12 and an associated fluid coupling component 14 which are removably mounted on the front and rear ends of the power spindle 16 of a lathe 18. The chuck component 12 may be an entirely conventional chuck (FIG. 1), having in this instance a plurality of radially movable jaws 20 and a central jaw actuator (not shown) which on axial movement in opposite directions moves the jaws into and from closure on work. The fluid coupling component 14 provides companion sections 22 and 24 of which the section 22 is carried by, and hence turns with, the power spindle 16, and the other section 24 is journalled in the rotary section 22 but is held against rotation and, hence, is stationary. The rotary coupling section 22 (FIG. 2) provides a cylinder 26 with a piston 28 therein which is connected with the rear end of a drawbar 30 that extends through the power spindle 16 (FIG. 1) and is at its front end connected with the jaw actuator of the chuck component 12 for axially moving the same on admission of operating fluid under pressure to either end 32 or 34 of the cylinder 26, with the cylinder ends 32 and 34 being in this instance the chuck-closing and chuck-opening ends, respectively. The stationary coupling section 24 is also provided with ports 36 and 38 to which conduits 40 and 42 are connected, and the coupling sections 22 and 24 are further provided with fluid passages 44 and 46 which lead from the ports 36 and 38 to the cylinder ends 32 and 34. Preferably interposed in the fluid passages 44 and 46 are check valves 48 and 50 which are normally closed to block the flow of operating fluid from the respective cylinder ends 32 and 34 but open to admit fluid under pressure into these cylinder ends. The fluid coupling component 14 described so far may be of a conventional and well known type which usually has also provisions (not shown) for opening either check valve 48 or 50 to vent the respective cylinder end 32 or 34 on admission of operating fluid under pressure to the opposite cylinder end.

The chuck installation has also provisions for counteracting the effects of centrifugal force on the jaws in operation of the chuck to thereby prevent any appreciable, if not potentially hazardous, reduction of the work grip of the jaws at any, including the highest, chuck operating speeds. To this end, and in accordance with the invention, operational centrifugal force on the jaws, which tends to open the jaws and, hence, causes them to weaken, if not relinguish, their work grip, is counteracted by increasing the pressure of the jaw operating fluid with increasing operational centrifugal force of counterweights provided for the purpose. Still further in accordance with the invention, the jaw operating fluid the pressure of which is thus increased with increasing operational chuck speed, is the fluid admitted to, and in this instance also trapped by the check valve 48 in, the chuck-closing cylinder end 32 (FIG. 2). To thus increase the pressure of the operating fluid in the chuck-closing cylinder end 32, the rotary coupling section 22 is provided with a plunger 52 that is associated with the chuck-closing cylinder end, with the plunger 52 being to this end received with a sliding fit in a recess 54 in the coupling section 22 which is open to the cylinder end 32, and the plunger 52 is axially movable in its recess 54 in opposite directions to thereby decrease and increase the volume of this chuck-closing cylinder end and accordingly increase and decrease the pressure of operating fluid therein. With the chuck installation 10 being in this instance provided with a through-hole 56 about the axis x, the cylinder 26 and its piston 28, as well as the plunger 52 and its recess 54, are ring-shaped about the axis x and surround the through-hole 56. The aforementioned counterweights are in this instance in the form of arms 58 which are suitably secured to shafts 60 that are journalled in bearings 62 in the rotary coupling section 22 and are backed against end faces 64 of these bearings that take up all end thrust of these shafts in backward direction. The arms 58 on the shafts 60 are in this instance provided with inserts 59 of heavier metal to increase their weight. The shafts 60 extend parallel to the axis x, and they are spaced in this instance equiangularly about, and equally radially from, the axis x. The shafts 60 and their arms 58 are normally urged clockwise into a home position shown in FIG. 4 in which the arms 58 rest against a cylindrical surface 66 in the rotary coupling section 22, with each shaft 60 and its arm 58 being thus urged into the home position by a return spring 68 which surrounds the shaft and is anchored with its ends 70 and 72 to the arm and to the rotary coupling section 22 (FIG. 2). Rotational response of the shafts 60, counterclockwise as in FIG. 4 and counter to their return springs 68, to operational centrifugal force of their weight arms 58 is, by cam and follower connections between the shafts 60 and plunger 52, translated into axial motion of this plunger, in this instance to the right in FIG. 2 to decrease the volume of the chuck-closing cylinder end 32 and thereby increase the pressure of the operating fluid therein. The pressure of this operating fluid in the chuck-closing cylinder end 32 is thus increased to such an extent that the ensuing increase of the work-gripping force of the jaws compensates, at least partially and preferably fully, for the reduction of the work-gripping force of the jaws due to their operational centrifugal force. The cam and follower connections between the shafts 60 and plunger 52 are in this instance in the form of threads 74 on the shafts 60 and cylindrical nuts 76 which are in mesh with the threads 74 and project into rear apertures 78 in the plunger 52, with these nuts 76 being at 80 splined to the rotary coupling section 22 so as to be axially movable but non-turnable. To prevent possible binding of the plunger 52 in its recess 54 due to inevitable tolerances in the parts affected by centrifugal displacement of the weights 58 in operation of the chuck, there is provided an equalizer ring gear 82 which is freely turnable on the cylindrical surface 66 in the rotary coupling section 22 and is in mesh with identical pinions 84 which at 86 are keyed to the shafts 60. The plunger 52 and associated operating parts 58, 60, 68, 76, 82 and 84 may aptly be termed the "jaw balance system".

On admitting operating fluid under pressure into the chuck-closing cylinder end 32 to close the jaws 20 on work while the chuck is at rest, the plunger 52 is locked against yielding backwards under the pressure of this operating fluid by the weights 58 which are then spring-backed against the cylindrical surface 66 in the rotary coupling section 22 (FIG. 4). On the other hand, the return springs 68 for the weights 58 are calibrated, and the pitch of the threads 74 on the shafts 60 is selected, so that at increasing and decreasing speed of the chuck in its operation and correspondingly increasing and decreasing centrifugal force on the jaws and weights the plunger 52 will respond in axial displacement in opposite directions to increase and decrease the pressure of the operating fluid in the chuck-closing cylinder end 32 as required. Further, it is entirely feasible, and even highly desirable, to predetermine, by calculation, particulars of the prominent operating parts of the jaw balance system and their coordination whereby to achieve satisfactory centrifugal near-balance between the counterweights 58 and the jaws of a specific chuck at least within a preferred radial operating range of the jaws and also preferred speed range of the chuck. Also, the fluid for operation of the chuck is preferably hydraulic fluid because of its near-incompressibility, though the featured jaw balance system may readily be designed to function with air as the far more compressible operating fluid for a chuck.

The present provision of the jaw balance system in toto in the fluid coupling component 14 is quite advantageous in that it imposes no weight or size limitations on the associated chuck. Further, the jaw balance system, while provided in the rotary part 22 of the fluid coupling 14, is preferably provided in a separate adapter section 90 of the fluid coupling which is designed for interposition between the usual side-by-side sections 92 and 94 of the rotary coupling part. Thus, the chuck in any existing installation with a fluid coupling may be converted into a "centrifugally balanced" chuck by merely interposing an adapter section 90 between the regular sections 92 and 94 of the rotary part of the fluid coupling.

While the jaws 20 of the chuck 12 in the installation of FIGS. 1 to 4 close on work on being moved radially inwardly, the featured jaw balance system also lends itself to operation in a chuck installation in which the chuck jaws grip hollow work internally and, hence, are moved radially outwardly into closure on such work. Thus, the chuck 12a in FIG. 5, which is part of an installation having also a fluid coupling with the featured jaw balance system, has jaws 20a which are moved radially outwardly into closure on hollow wock W. In that case, operational centrifugal force on the jaws adds to their set grip on the work, and such increase of their work grip due to centrifugal force is counteracted by arranging the elements of the jaw balance system such that operational response of the plunger to increasing centrifugal force on the counterweights increases the volume of the associated chuck-closing cylinder end and, hence, decreases the pressure of the operating fluid therein as required. This may be achieved by a jaw balance system which may be similar to that shown in FIGS. 2 and 4, except that the weights 58 are then arranged to be spring-urged, not clockwise as in FIG. 4, but rather counterclockwise as the weights 58a in FIG. 5A.

While in the described chuck installation of FIGS. 1 to 4 the jaw balance system is preferably and advantageously provided in the fluid coupling component, it is also feasible (FIG. 6) to provide the jaw balance system in the chuck component 12b of an installation which also includes a fluid coupling 14b. Thus, the weight arms 58b, nuts 76b and pinions 84b on the shafts 60b, the plunger 52b and the ring gear 82b, are provided in the chuck component 12b, and the fluid coupling 14b lacks the cylinder 26b which, instead, is provided in the chuck component 12b.

What is claimed is:

1. In a chuck having a body with a through-hole about an axis and being turnable about said axis and carrying radially movable jaws, the combination of jaw operating means including a cylinder and piston in said body for closing the jaws on work on admission of operating fluid under pressure into one end of the cylinder, a plunger in said body ring-shaped about said axis and projecting with one end into said cylinder end and being axially movable in opposite directions to decrease and increase the volume of said cylinder end, and other means, including a weight in said body formed in separate sections angularly spaced about said axis and individually movable inwardly toward and outwardly away from said axis within a ring-shaped zone about said axis, with said sections being yieldingly urged toward said axis, and operative to move said plunger in one of said directions on outward movement of said weight sections under centrifugal force to thereby change the pressure of the operating fluid in said cylinder end for counteracting the effects of centrifugal force on said jaws, said cylinder and piston are ring-shaped about said axis and surround said through-hole, said plunger is within the inner and outer diametric confines of said cylinder, and said zone surrounds said through-hole.

2. The combination in a chuck as in claim 1, in which said other means further include shafts rotatably mounted in said body within said zone, with said shafts extending parallel to said axis and being spaced equiangularly about and equally radially from said axis, said weight sections are in the form of identical radial arms on said shafts, and said arms are spring-urged in one rotary direction into a home position in which they lie tangent to a circle about said axis.

3. The combination in a chuck as in claim 2, in which said other means further include cam and follower connections between said shafts and plunger cooperating on turning response of said shafts to centrifugal force on said arms to move said plunger in said one direction, identical pinions on and keyed to said shafts, and a synchronizer ring gear turnable in said body about said axis and meshing with said pinions.

4. The combination in a chuck as in claim 3, in which said cam and follower connections between said shafts and plunger are in the form of screw threads on said shafts and nuts received on said shafts in mesh with said threads and held against rotation so as to respond in axial motion to rotation of said shafts, and said plunger is backed against said nuts.

5. In a fluid coupling for a chuck having companion fixed and rotary sections with a common axis, a port in said fixed section, a cylinder and piston in said rotary section, and a first fluid passage in said sections leading from said port to one end of said cylinder, the combination of a plunger in said rotary section ring-shaped about said axis and projecting with one end into said cylinder end and axially movable in opposite directions to decrease and increase the volume of said cylinder and thereby increase and decrease the pressure of operating fluid therein, and means in said rotary section, including a weight formed in separate sections angularly spaced about said axis and individually movable inwardly toward and outwardly away from said axis within a ring-shaped zone about said axis, with said weight sections being yieldingly urged toward said axis, and said means is operative to move said plunger in one of said directions on outward movement of said weight sections under centrifugal force to thereby change the pressure of operating fluid in said cylinder end, said coupling sections have a through-hole about said axis and surround said through-hole, said plunger is within the inner and outer diametric confines of said cylinder, and said zone surrounds said through-hole.

6. The combination in a fluid coupling for a chuck as in claim 5, in which said means further include shafts rotatably mounted in said rotary coupling section within said zone, with said shafts extending parallel to said axis and being spaced equiangularly about and equally radially from said axis, said weight sections are in the form of identical radial arms on said shafts, and said arms are spring-urged in one rotary direction into a home position in which they lie tangent to a circle about said axis.

7. The combination in a fluid coupling for a chuck as in claim 6, in which said means further include cam and follower connections between said shafts and plunger cooperating on turning response of said shafts to centrifugal force on said arms to move said plunger in said one direction, identical pinions on and keyed to said shafts, and a synchronizer ring gear turnable in said rotary coupling section about said axis and meshing with said pinions.

8. The combination in a fluid coupling for a chuck as in claim 7, in which said cam and follower connections between said shafts and plunger are in the form of screw threads on said shafts and nuts received on said shafts in mesh with said threads and held against rotation so as to respond in axial motion to rotation of said shafts, and said plunger is backed against said nuts.

* * * * *